United States Patent [19]

Young et al.

[11] 4,110,972

[45] Sep. 5, 1978

[54] SEAL MEANS FOR A MOVABLE CENTERBODY IN A TWO DIMENSIONAL NOZZLE

[75] Inventors: John H. Young, South Windsor, Conn.; Gerald F. Goetz, Seattle, WA

[73] Assignee: United Technologies Corporation, Hartford, Conn.

[21] Appl. No.: 751,428

[22] Filed: Dec. 16, 1976

[51] Int. Cl.² .......................... F02K 1/12; F02K 11/04
[52] U.S. Cl. .......................................... 60/230; 60/266; 60/271; 239/265.19
[58] Field of Search ............. 60/230, 271, 266, 39.66; 239/265.19, 265.33, 265.37, 265.39, 265.35, 265.41, 265.43

[56] References Cited

U.S. PATENT DOCUMENTS

| | | | |
|---|---|---|---|
| 3,774,868 | 11/1973 | Goetz | 239/265.19 |
| 4,000,612 | 1/1977 | Wakeman et al. | 60/230 |
| 4,037,405 | 7/1977 | Huenniger et al. | 60/230 |

Primary Examiner—Robert E. Garrett
Attorney, Agent, or Firm—Norman Friedland

[57] ABSTRACT

This invention relates to sealing means for a movable centerbody having collapsible panels located in the two-dimensional exhaust nozzle of a jet engine so that movement of the centerbody and collapsing its walls serves to provide thrust vectoring, variable geometry and internal nozzle expansion. Cooling air supplied internally of said centerbody is utilized to pressurize the seal to assure that the jet exhaust does not ingress into the centerbody cavity or cooling air does not indiscriminately egress therefrom.

10 Claims, 6 Drawing Figures

SEAL MEANS FOR A MOVABLE CENTERBODY IN A TWO DIMENSIONAL NOZZLE

BACKGROUND OF THE INVENTION

This invention relates to gas turbine engine exhaust nozzles and particularly to a two-dimensional configuration having a movable and collapsible wall centerbody and the sealing, cooling and pressurizing means therefore.

The efficacy which a centerbody operates in the exhaust of the jet engine is dependent not only on its construction but, of equal importance, on the means for cooling and pressure balancing it. One of the major problems in a cooling scheme of an articulate centerbody pivotable, particularly at more than one pivot point, and one that has its walls collapsible, is the sealing in of internal cooling air and sealing out the hot exhaust products of combustion of the engine. It is abundantly important to hold friction at a minimum.

This invention contemplates sealing the centerbody of a two-dimensional nozzle configured to change the nozzle area, provide thrust vectoring and internal nozzle expansion. A wedge shaped segmented centerbody having pivot points to change its orientation, and having collapsible walls to change its distance relationship with the cooperating side wall of the nozzle serves to provide these functions. The centerbody extends to opposite flat side walls of the nozzle and is in sliding relationship thereto; for both the pivoting and collapsing modes. The movement of the centerbody and its wall structure is accomplished by appropriate actuator and linkages mounted within the centerbody.

We have found that we can achieve a satisfactory sealing at the side walls while incurring minimal flow losses and holding friction to a minimum by incorporating spaced elongated seal elements secured to the centerbody defining therewith an open ended channel adapted to channel pressurized cooling air. The cooling air pressure internally of the seal is so selected to accommodate the pressure reversal between the exhaust gas pressure variation (hot side) and centerbody cavity pressure (cold side). The seals are spring loaded in such a manner as to maintain contact at minimum internal seal pressure levels and pressure loaded to maintain intimate contact with the side walls during the entire operating range of the engine.

SUMMARY OF THE INVENTION

An object of this invention is to provide seal means for a movable centerbody operating in a two-dimensional exhaust nozzle of a gas turbine engine.

A still further object of this invention is to provide segmented channel seals cooperating with each successive channel to maintain a sufficient pressure within the centerbody to achieve pressure balancing where hot exhaust gas pressure and cooling pressure acting on the centerbody panels evidences a reversal in the direction of force generated thereby.

A still further object of this invention is to provide spaced elongated seal elements on a wedge shaped centerbody defining an elongated open ended channel to accommodate cooling air flow provide a given pressure and having spring means, both cooperating to keep the seals in intimate contact with the adjacent side wall through the articulated range of the centerbody and its collapsible panel walls.

Other features and advantages will be apparent from the specification and claims and from the accompanying drawings which illustrate an embodiment of the invention.

DESCRIPTION OF THE PREFERRED EMBODIMENT

Figures 1, 1A:
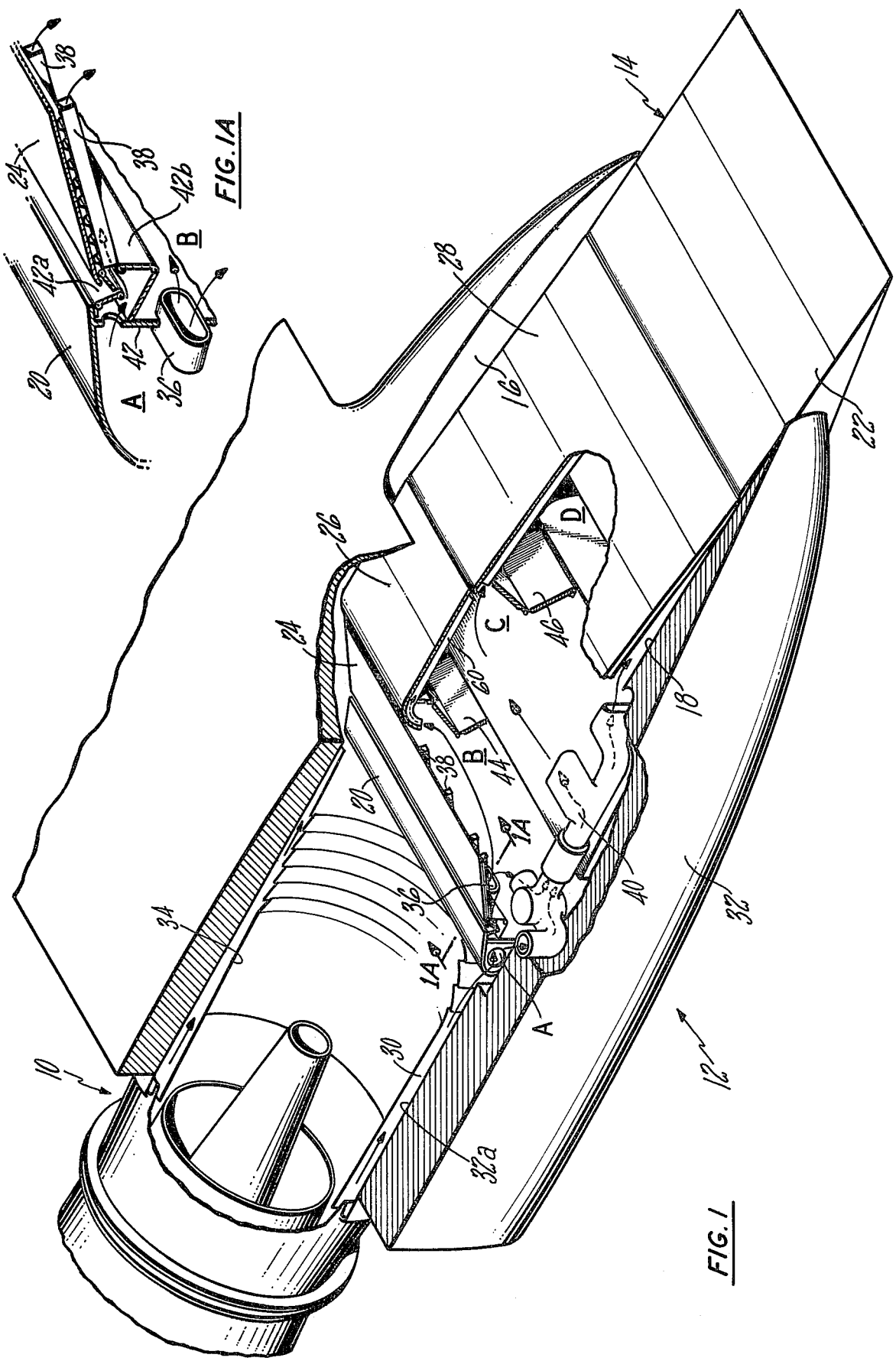
FIG. 1 is a perspective view partially showing the aircraft and the engine exhaust employing this invention.
FIG. 1A is taken along line 1A—1A of FIG. 1 and is shown in perspective and enlarged to illustrate the cooling flow pattern in the adjacent compartments.

As can be seen from FIG. 1 showing the tail pipe portion 10 of a gas turbine engine discharging into the two-dimensional nozzle generally illustrated by reference numeral 12 which may be fabricated integral with the engine nacelle. Centerbody wedge 14 extending between parallel side walls 16 and 18 and define with the two-dimensional nozzle an upper and lower channel for directing the exhaust gases overboard of the aircraft in order to effectuate thrust vectoring, nozzle area control and internal nozzle expansion. Two-dimensional nozzles and the obtaining of these enumerated features are known in the art and this invention is particularly concerned with the sealing, and means for assuring that hot gases do not ingress in the centerbody cavity because of pressure reversal and indiscriminate leakage of cool air within the cavity. U.S. Pat. No. 3,774,868 granted on Nov. 27, 1973 to G. F. Goetz exemplifies an integrated nozzle employing these features and should be referred to for a more detailed description and is incorporated herein by reference.

As can be seen the centerbody comprises a leading edge 20, which may be fixed, trailing edge 22 and intermediate panels 24, 26 and 28 which may be articulated in any well known manner. Each section is compartmentized except for the trailing edge 22, into chambers A, B, C and D. A suitable pressure and cooling management control serves to distribute and regulate flow from a source of cooler air (as from the fan discharge in a turbofan installation) to cool and pressure balance the movable and collapsible wall centerbody wedge 14.

To this end, cooler air flows in the annular passage 30 formed between nacelle inner wall 32a of nacelle 32 and the cooling liner 34. The nacelle inner wall 32a and cooling liner 34 fairs from a circular cross section to a rectangular cross section for efficiently conducting flow from the engine tail pipe to the two-dimensional nozzle. Cooler air is admitted into compartment A of panel 20 as well as through the hollow beam support 38, into compartment B through pipe 36 and pressure reducer (not shown) and then through pipe 40 and pressure reducer (not shown) into compartment C and similarly into compartment D.

It is apparent from FIG. 1 that compartments A, B, C and D are divided into three separate compartments by bulkhead wall 42 and folding hinge 42a, hinge link 42b between compartments A and B (See FIG. 1A) and folding wall 44 between compartments B and C and folding wall 46 between compartments C and D and each compartment is pressurized to achieve both pressure balancing and adequate seal pressure as will be described hereinbelow.

Figure 2:
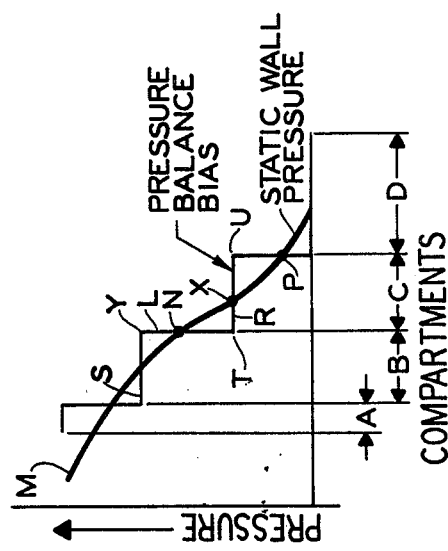
FIG. 2 is a graph illustrating the controlled pressure level in the centerbody.

The pressure distribution is best seen in the graph illustrated in FIG. 2. The pipe sizes and pressure reducers are selected to achieve a pressure drop described by stepped curve L from compartment A through D where the pressure admitted into compartment A is at its highest value and pressure discharge from D is at its lowest which is approximately equal to ambient. This pressure serves to pressure balance that is create a force equal and opposite to counteract the static wall pressure created by the exhaust engine gases flowing through the two-dimensional nozzle acting on the centerbody. Thus, the overall force created by the outside and inside pressures acting on each of the panels of the centerbody tends to cancel each other.

The pressure management system and the seal arrangement also assures that the pressure on the seal as will be explained hereinbelow is so controlled from one panel to the other as to accommodate the situation where there is a pressure gradient reversal between the hot side (exposed to exhaust gases), and the cold air (exposed to cooling air) occurring along the axial length of the panel. That is to say, at some indeterminant point along the axial length of each centerbody compartment, the pressure acting internally creates a larger force on the panel than the pressure acting externally on the panel and the seal is designed to accommodate this occurrence. Thus, preventing (A) unwanted ingesting of hot gases into the centerbody and (B) the escape of cooling air from within the centerbody.

Figure 3:
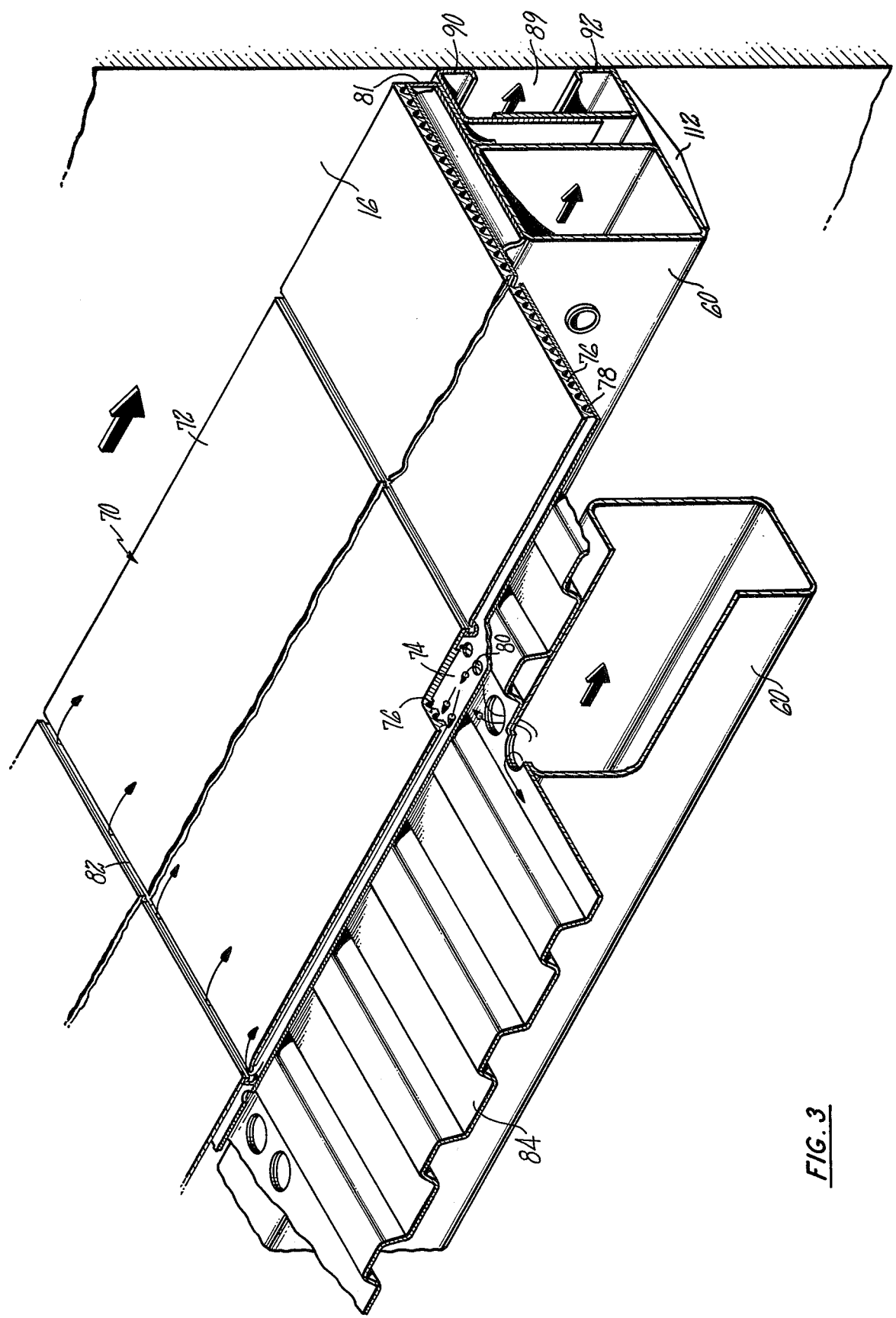
FIG. 3 is a partial view in perspective illustrating the panel and seal configuration of the centerbody wedge.

A typical panel construction is illustrated in FIG. 3 which shows laterally spaced hollow support beam 60 (only two of several being shown) that serves to support corrugated plate 84 and cooling panel 70 of Finwall ® construction. (The registered tradename of United Technology Corporation). The Finwall panels may comprise a corrugated sheet of metal sandwiched between upper and lower plates defining open ended channels or the channels may be formed integral with one of the spaced plates. As can be seen in FIG. 3 panel 70 as being representative has upper plates 72 and lower plate 74 and the laterally spaced webs 76 depending from plate 72 define open-ended channels 78.

Cooling air migrating through the centerbody structure finds its way through holes 80 formed in the lower plate 74 and flows through channels 78 counter to the flow of the engine exhaust passing over panel 72. The cooled air is discharged into the engine exhaust at the slot 82 located on the upstream end of panel 70. A plurality of panels make up each of the sections of the centerbody.

The Finwall panels are supported to a corrugated support plate 84 which, in turn, is supported to hollow support beams 60. It will be noted that openings communicating with the cool air passage in support beams 60 interconnect with the opening 80 feeding cool air to the Finwall panels. End plates 81 (one being shown) extend along the side edges of the corrugated support plate 84 to prevent cool air escapement.

Figure 4:
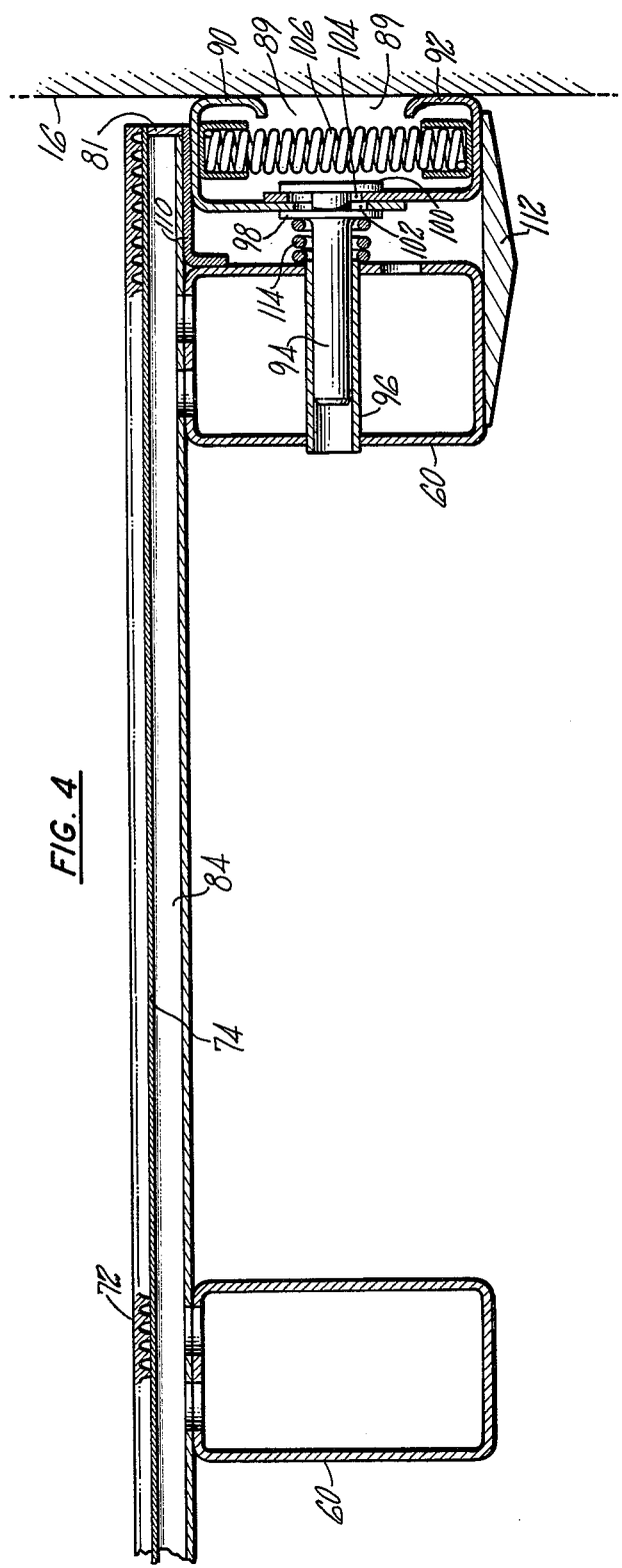
FIG. 4 is a detailed view in section and elevation showing the seal construction.

According to this invention and as shown in FIG. 4 the hollow support beam 60 is spaced from the side edge of the centerbody adjacent the side wall which space 89 extends the side of each panel of the centerbody. Elongated substantially U-shaped seal elements 90 and 92 are supported in space 89. Spring loaded push rod 94 is supported for rectilinear movement in the bushing insert 96 secured to beam 60. Each of the seal elements 90 and 92 are retained between the flange elements 98 and 100 and are permitted to move vertically through the enlarged slots 102 and 104 formed respectively therein.

Spring 106 extending between seal elements 90 and 92 urge the seal in contact against the face of seal element 84. Pressure in space 89 as will be explained hereinbelow is higher than pressure in the adjacent compartment along the edge of the seal and the static wall pressure created by the engine exhaust gases.

The pressure pattern can best be understood by referring again to FIG. 2. Looking at compartment C, for instance, the static pressure on the panel 26 is represented along curve M from points N to P. The cooling air pressure in compartment C as controlled by the pressure management system is an integrated pressure or pressure balance bias designed to substantially balance the forces acting externally on panel 26 and represented by line R. This equivalent pressure balance bias in the next preceding compartment B is represented by line S which is at some value higher than R (the pressure in compartment C). As noted from FIG. 1 support beam 60 of panel 26 extends into compartment B and C such that it leads cooling air from compartment B into channel 60 of panel 26, and the pressure between these points is substantially constant. This pressure, therefore, is higher than the pressure in compartment C and higher than the static wall pressure between points N and P. The fluid pressure in 60 is fed to space 89 so that the pressure in space 89 is substantially the same as in 60 along its axial length.

As noted from FIG. 2, the pressure balance bias pressure from points T and U from point X changes from being lower than the static wall pressure above point X to higher than the static wall pressure below point X. This reversal is accommodated by the seal pressure by maintaining the pressure in chamber 89 equal to the next preceding chamber pressure represented by point Y in this example. The pressure in all the other panels are similarly controlled.

As is apparent from the foregoing the higher pressure in space 89 acting on the underneath side of sealing elements 90 and 92 causes it to bear against the side wall of the two-dimensional nozzle and the elongated lip 110 and shelf 112 which is secured in any suitable manner to the underside of beam 60. The action of compression coil springs 106 and 114 work in the same direction as the force created by the pressure in space 89 and keep the seal elements 90 and 92 in sealing engagement under low pressure circumstances. In this manner, the hot gases exhausting from the engine and passing over the centerbody are kept from entering the centerbody and the cooling air is directed through the centerbody to effectively perform its cooling and pressure balancing functions.

Figure 5:
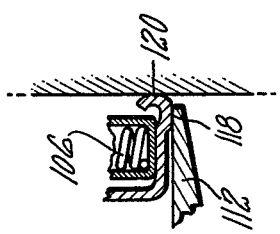
FIG. 5 is a modified seal configuration.

FIG. 5 exemplifies another version of the seals 90 and 92 as shown in cross section the sealing lip portions 118 and 120 are reduced in size and are curved to form a "C" shaped member, and the arms of the "U" is relieved in back of the lip to minimize seal contact hence pressure loading to further minimize friction.

It should be understood that the invention is not limited to the particular embodiments shown and described herein, but that various changes and modifications may be made without departing from the spirit or scope of this novel concept as defined by the following claims.

What is claimed is:

1. For aircraft, in combination, a two-dimensional nozzle exhausting the products of combustion manifested by the aircraft's engine, a pivotable wedge centerbody having collapsible walls to vary its orientation in said nozzle and change the geometry thereof, a source of cooling air and means interconnecting the cavity of said centerbody with said source, sealing means for preventing the inclusion of products of combustion internally of said centerbody and the leakage of cooling air contained within said centerbody cavity, said sealing means including a pair of laterally spaced elongated members movably supported to the lateral edges of said centerbody adjacent the flat side wall of said two-dimensional nozzle defining therewith an open ended channel, means for communicating cooling air to pressurize said open ended channel so that one portion of said elongated member is urged against said flat wall of said two-dimensional nozzle and another portion of said elongated member is urged against said centerbody.

2. Apparatus as in claim 1 wherein the said collapsible wall means includes segmented axially aligned panels extending the surface between pivotal juncture points of said collapsible walls, the value of the pressure in said open ended channel contiguous with said segmented panel being higher than the static pressure of the products of combustion flowing thereover.

3. Apparatus as in claim 1 wherein the cross section of said elongated member is substantially U-shaped.

4. For aircraft, in combination, a two-dimensional nozzle exhausting the products of combustion manifested by the aircraft's engine, a pivotable wedge centerbody having collapsible walls to vary its orientation in said nozzle and change the geometry thereof, means for defining separate axially spaced compartments within said centerbody, a source of cooling air and means interconnecting successively each of said compartments with said source, sealing means for preventing the inclusion of products of combustion internally of said centerbody and the leakage of cooling air in said compartments, said sealing means including a pair of laterally spaced substantially U-shaped elongated members movably supported to the lateral edges of said centerbody adjacent the flat side wall of said two-dimensional nozzle defining therewith an open ended channel, means for communicating cooling air in the next adjacent upstream compartment to pressurize said open ended channel so that one portion of said U-shaped elongated member is urged against said flat wall of said two-dimensional nozzle and another portion of said U-shaped elongated member is urged against said centerbody.

5. The invention as in claim 1 including a plurality of panels defining the outer wall of said wedge centerbody, a plurality of spaced axially extending hollow beams supporting said panels, at least one of said beams extending into the next adjacent upstream chamber for leading cooling air axially therethrough, and said one of said beams supporting said sealing means at each panel edge and leading cooling air into said open ended channel whereby the pressure of the cooling air is higher than the static pressure of acting externally of said panels and higher than the cooling air in the laterally disposed compartment.

6. The invention as in claim 5 including a slidable member supporting said U-shaped elongated members for permitting the sealing surface of said U-shaped member to bear against the flat side wall of said two-dimensional nozzle as a function of the pressure in said open enedded channel.

7. The invention as in claim 6 including spring means urging said slidable member laterally.

8. The invention as in claim 6 including resilient biasing means interposed between each of said pair of U-shaped members urging them in sealing engagement.

9. The invention as in claim 4 wherein said wedge centerbody includes a plurality of panels, at least some of said panels having an upper and lower spaced flat plates and webs extending therebetween defining open ended channels for leading cooling air in counter flow in direct heat exchange relation to the exhaust flow and slots adjacent said panels for discharging said cooling air into the exhaust streams of said two-dimensional nozzle.

10. For aircraft, in combination, a two-dimensional nozzle exhausting the products of combustion manifested by the engine, a pivotable wedge centerbody having collapsible walls to vary its orientation in said nozzle and change the geometry thereof, means for defining separate axially spaced compartments within said wedge centerbody, a source of cooling air and means interconnecting successively each of said compartments with said source, sealing means for preventing the inclusion of products of combustion internally of said centerbody and the leakage of cooling air in said compartments, said sealing means including a pair of laterally spaced elongated members supported to the side edges of said wedge centerbody having sealing faces bearing on the flat side wall of said two-dimensional nozzle and defining therewith an open ended channel and being in sliding relationship with said flat side wall, means leading cooling air from the next adjacent upstream compartment to pressurize said open ended channel at a predetermined value above the static pressure acting externally on said wedge centerbody urging said sealing faces in sealing engagement with said flat side wall.

* * * * *

UNITED STATES PATENT AND TRADEMARK OFFICE
CERTIFICATE OF CORRECTION

PATENT NO. : 4,110,972
DATED : September 5, 1978
INVENTOR(S) : John H. Young, Gerald F. Goetz It is certified that error appears in the above-identified patent and that said Letters Patent are hereby corrected as shown below:

Column 1, insert the following paragraph before the "BACKGROUND OF THE INVENTION":

--The Government has rights in this invention pursuant to Contract No. N00140-73-C-0027 awarded by the Department of the Navy.--

Column 3, line 40, "Technology" should read --Technologies--

Column 6, line 16, "eneded" should read --ended--

Signed and Sealed this

Twenty-third Day of October 1979

[SEAL]

Attest:

RUTH C. MASON
Attesting Officer

LUTRELLE F. PARKER
Acting Commissioner of Patents and Trademarks